US012656114B2

(12) United States Patent
Kikuchi

(10) Patent No.: US 12,656,114 B2
(45) Date of Patent: Jun. 16, 2026

(54) UNEVENNESS LEVEL INSPECTING DEVICE, UNEVENNESS LEVEL INSPECTIING SYSTEM, AND UNEVENNESS LEVEL INSPECTING METHOD

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 934 days.

(21) Appl. No.: 17/952,931

(22) Filed: Sep. 26, 2022

(65) Prior Publication Data

US 2023/0099546 A1 Mar. 30, 2023

(30) Foreign Application Priority Data

Sep. 30, 2021 (JP) ................................. 2021-160648

(51) Int. Cl.
 *G01C 15/00* (2006.01)
 *G01B 17/08* (2006.01)
 (Continued)

(52) U.S. Cl.
 CPC .......... *G01C 15/006* (2013.01); *G01B 17/08* (2013.01); *G01C 15/04* (2013.01); *G01S 17/42* (2013.01)

(58) Field of Classification Search
 CPC ...... G01C 15/006; G01C 15/04; G01B 17/08; G01S 17/42
 See application file for complete search history.

(56) References Cited

U.S. PATENT DOCUMENTS

2013/0162469 A1 6/2013 Zogg et al.
2018/0328744 A1 11/2018 Miyake et al.
(Continued)

FOREIGN PATENT DOCUMENTS

CN 107718896 2/2018
EP 0919837 6/1999
(Continued)

OTHER PUBLICATIONS

Related U.S. Appl. No. 17/952,958, filed Sep. 26, 2022.
Related U.S. Appl. No. 17/946,448, filed Sep. 16, 2022.

*Primary Examiner* — Jamil Ahmed
(74) *Attorney, Agent, or Firm* — Studebaker Brackett PLLC

(57) ABSTRACT

An unevenness level inspecting device includes a target T at a known distance from a to-be-inspected surface, a traveling unit for traveling on the to-be-inspected surface, a first marker for marking information on the to-be-inspected surface, and a control unit configured to control the first marker, and the control unit calculates a height of the to-be-inspected surface at a measurement position of the target T based on three-dimensional position coordinates of the target input each time the unevenness level inspecting device travels a predetermined distance, and controls the first marker so as to mark unevenness level information indicating a difference between the height of the to-be-inspected surface and a reference height on a corresponding position on the to-be-inspected surface, and the unevenness level information is marked in a color that differs depending on a magnitude of the difference between the height of the to-be-inspected surface and the reference height.

16 Claims, 13 Drawing Sheets

(51) Int. Cl.
_G01C 15/04_ (2006.01)
_G01S 17/42_ (2006.01)

(56) References Cited

U.S. PATENT DOCUMENTS

| | | | |
|---|---|---|---|
| 2019/0196492 A1 | 6/2019 | Casale et al. | |
| 2019/0381529 A1 | 12/2019 | Schaumberger | |
| 2020/0094577 A1 | 3/2020 | Laurance | |
| 2020/0338580 A1 | 10/2020 | Herget et al. | |
| 2021/0078319 A1 | 3/2021 | Herget et al. | |

FOREIGN PATENT DOCUMENTS

| | | | | | |
|---|---|---|---|---|---|
| EP | 2503284 | | 9/2012 | | |
| EP | 3182066 | | 6/2017 | | |
| EP | 3 842 376 A1 | | 6/2021 | | |
| JP | 2001-201488 | A | 7/2001 | | |
| JP | 2005-054430 | A | 3/2005 | | |
| JP | 2017-020972 | A | 1/2017 | | |
| JP | 2017-091370 | A | 5/2017 | | |
| JP | 2018-009394 | A | 1/2018 | | |
| JP | 2018069531 | | 5/2018 | | |
| JP | 2018-180919 | A | 11/2018 | | |
| JP | 2018-200217 | A | 12/2018 | | |
| JP | 2020-060018 | A | 4/2020 | | |
| JP | 2021-11772 | A | 2/2021 | | |
| JP | 2021011772 | | 2/2021 | | |
| JP | 2021011772 | A * | 2/2021 | ............... | G01C 7/04 |
| JP | 2021-043114 | A | 3/2021 | | |
| JP | 2021-102501 | A | 7/2021 | | |
| KR | 101646201 | | 8/2016 | | |
| WO | 2008/038960 | A1 | 4/2008 | | |
| WO | 2008124713 | | 10/2008 | | |
| WO | 2020167298 | | 8/2020 | | |
| WO | 2021182294 | | 9/2021 | | |

* cited by examiner

Inspecting device 1  Surveying instrument 6

FIG. 4

Inspecting device 1

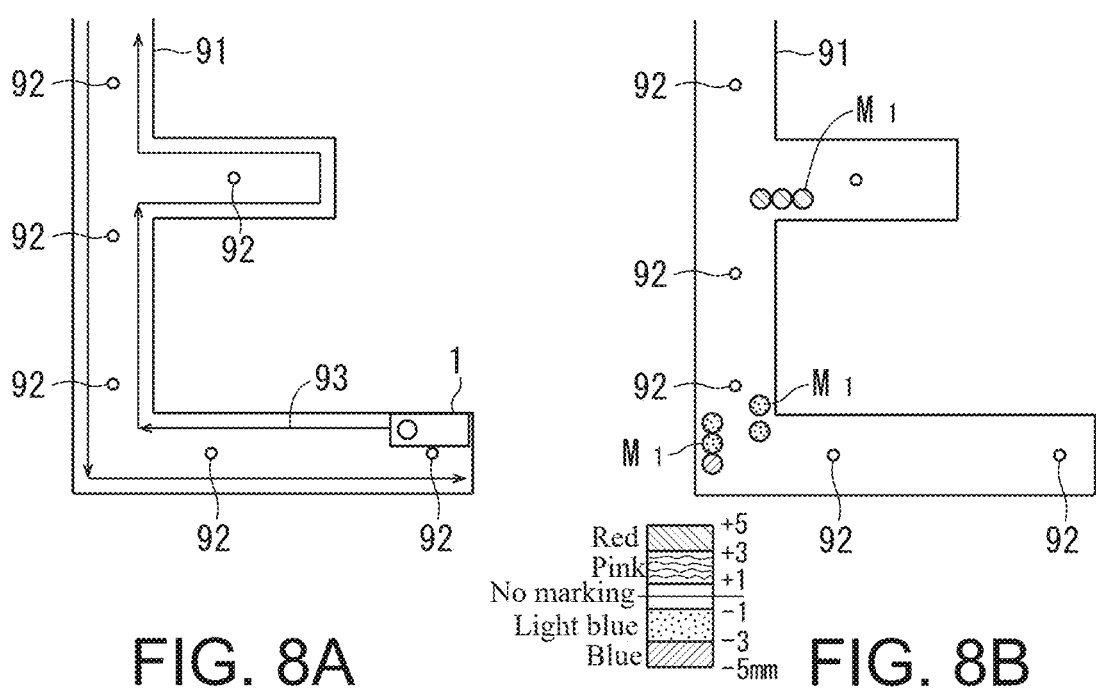
FIG. 8A
FIG. 8B
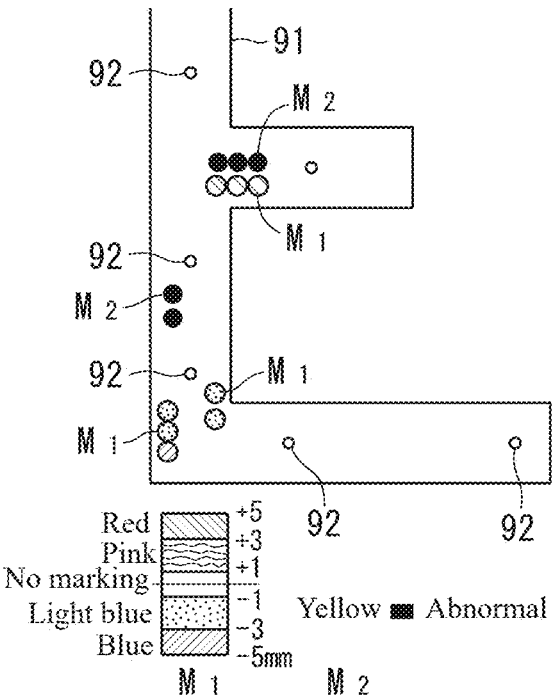
FIG. 8C

Inspecting device 1

UNEVENNESS LEVEL INSPECTING DEVICE, UNEVENNESS LEVEL INSPECTIING SYSTEM, AND UNEVENNESS LEVEL INSPECTING METHOD

CROSS-REFERENCE TO RELATED APPLICATION, BENEFIT CLAIM, AND INCORPORATION BY REFERENCE

The present disclosure claims priority under 35 U.S.C. § 119 to Japanese Patent Application No. 2021-160648 filed Sep. 30, 2021. The contents of this application are incorporated herein by reference in their entirely.

TECHNICAL FIELD

The present invention relates to an unevenness level inspecting device, an unevenness level inspecting system, and an unevenness level inspecting method, more specifically, to an unevenness level inspecting device, an unevenness level inspecting system and an unevenness level inspecting method for inspecting the levelness accuracy of an upper surface of a structure.

BACKGROUND ART

During a construction work, normally, a foundation work is performed in which a foundation serving as a base structure of a building is constructed. A rising top end of the foundation is required to have a level upper surface (that is, to eliminate level differences of the top end as much as possible). This is because, in actuality, the levelness accuracy of the building depends on the top end accuracy. In this description, a "top end" means a portion that is an uppermost surface of an arbitrary structure regardless of a foundation rising.

Therefore, after placement of concrete at the foundation rising, a self-leveling material called a top end leveler is poured into a formwork about several millimeters to 1 centimeter to level an upper surface of the top end. The top end leveler is mortar adjusted to be lower in viscosity than ready mix concrete, and when the top end leveler is poured into the formwork, it spreads evenly and brings about a level finish.

However, in actuality, it is difficult to obtain perfect levelness. While a low portion needs additional application, a high portion needs to be scraped off. The top end accuracy during work is confirmed by a worker by measurement with a measuring tape, and this operation is complicated. Therefore, there is a need for an automatic measurement of the unevenness level of a top end.

CITATION LIST

Patent Literature

Patent Literature 1: Japanese Published Unexamined Patent Application No. 2021-11772

SUMMARY OF INVENTION

Technical Problem

Patent Literature 1 discloses an unevenness level inspecting device that includes a traveling mechanism, a target, and a control unit, and travels to a desired position while performing tracking by a surveying instrument (total station)

having an automatic tracking function, measures an unevenness level of a floor surface from measurement results of the target, and prints unevenness level information.

Solution to Problem

The unevenness level inspecting device of Patent Literature 1 numerically indicates, as unevenness level information, height adjusting amounts of facilities and equipment to be installed on a floor surface. At a construction site, etc., although numerical values are important, there is a need for realizing more intuitive and visual recognition of the entire site by overlooking the site, and development of a technology to print unevenness level information on a to-be-inspected surface in an aspect different from a conventional manner has been required.

The present invention was made in view of these circumstances, and an object thereof is to provide an unevenness level inspecting device, an unevenness level inspecting system and an unevenness level inspecting method by which unevenness level information can be printed on a to-be-inspected surface in an intuitively and visually recognizable manner.

Solution to Problem

In order to achieve the object described above, an unevenness level inspecting device according to an aspect of the present invention includes a target at a known distance from a to-be-inspected surface, a traveling unit for traveling on the to-be-inspected surface, a first marker for marking information on the to-be-inspected surface, and a control unit configured to control the first marker, wherein the control unit calculates a height of the to-be-inspected surface at a measurement position of the target based on three-dimensional position coordinates of the target input each time the unevenness level inspecting device travels a predetermined distance, and controls the first marker so as to mark unevenness level information indicating a difference between the height of the to-be-inspected surface and a reference height on a corresponding position on the to-be-inspected surface, and the unevenness level information is marked in a color that differs depending on a magnitude of the difference between the height of the to-be-inspected surface and the reference height.

An unevenness level inspecting system according to another aspect of the present invention is a system including the unevenness level inspecting device according to the above aspect, and a surveying instrument emitting distance-measuring light such toward the target, and receiving reflected light to measure a distance and an angle to the target.

An unevenness level inspecting method according to another aspect of the present invention is an unevenness level inspecting method using an unevenness level inspecting device including a target at a known distance from a to-be-inspected surface, a traveling unit for traveling on the to-be-inspected surface, a first marker for marking information on the to-be-inspected surface, and a control unit configured to control the first marker, wherein the control unit calculates a height of the to-be-inspected surface at a measurement position of the target based on three-dimensional position coordinates of the target input each time the unevenness level inspecting device travels a predetermined distance, and controls the first marker so as to mark unevenness level information indicating a difference between the height of the to-be-inspected surface and a reference height on a corresponding position on the to-be-inspected surface, and the unevenness level information is marked in a color that differs depending on a magnitude of the difference between the height of the to-be-inspected surface and the reference height.

Benefits of Invention

By the unevenness level inspecting device, an unevenness level inspecting system, and the unevenness level inspecting method according to the aspects described above, unevenness level information can be printed on a to-be-inspected surface in an intuitively and visually recognizable manner.

BRIEF DESCRIPTION OF DRAWINGS

FIG. 4 is a process flowchart of basic operations of the inspecting device and a surveying instrument in the same inspecting system.

FIG. 8A is a view illustrating an example of an inspection route using the same inspecting system, and FIGS. 8B and 8C are views illustrating examples of inspection results to be marked on a to-be-inspected surface on the same route.

DESCRIPTION OF EMBODIMENTS

Hereinafter, preferred embodiments of the present invention will be described with reference to the drawings, however, the present invention is not limited to these. Components having the same function common to the respective embodiments and modifications are provided with the same name, and the same components are provided with the same reference signs, and overlapping description will be omitted as appropriate.

First Embodiment

1. Unevenness Level Inspecting System S

Figure 1:
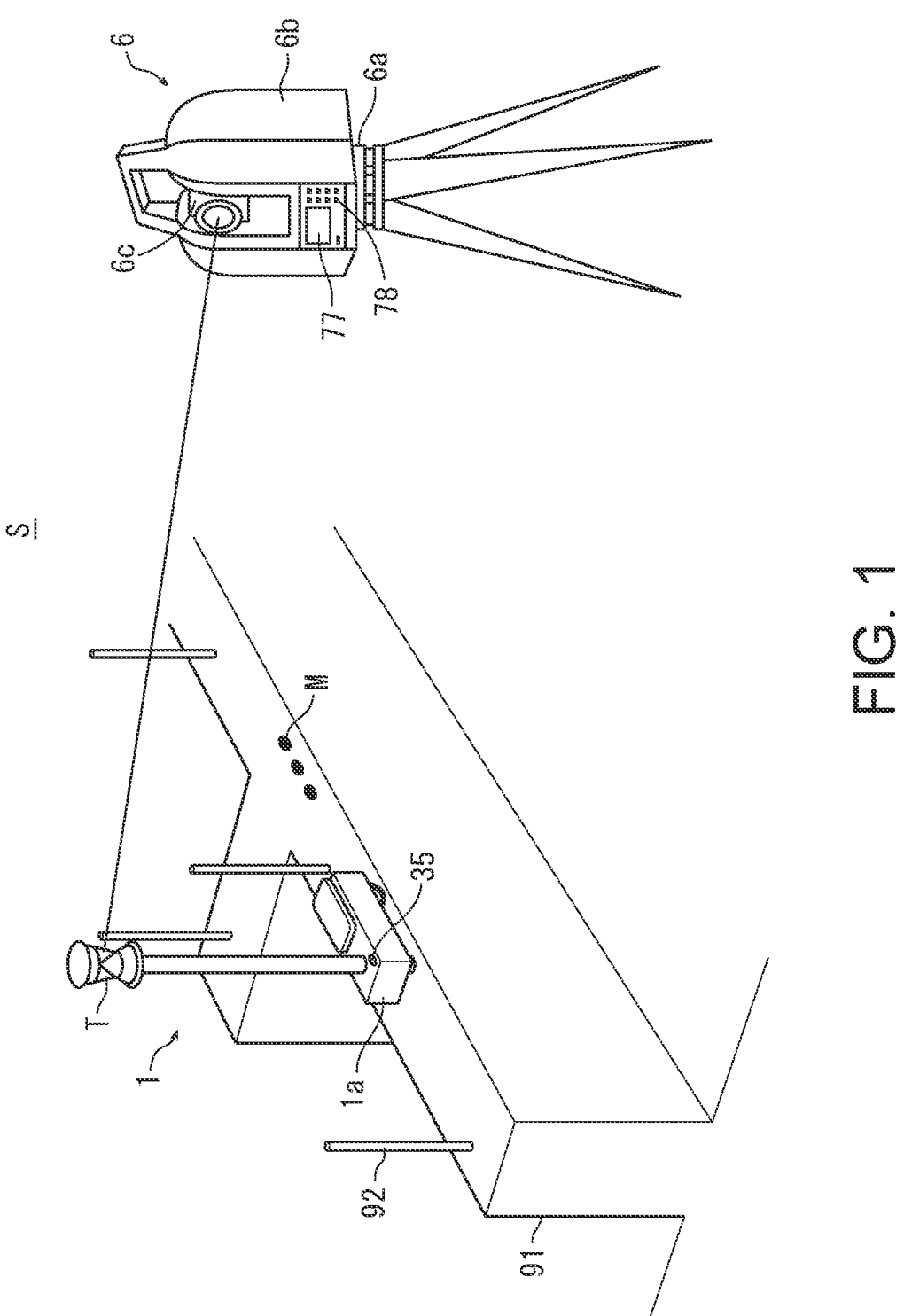
FIG. 1 is a view illustrating an outline of an unevenness level inspecting system according to an embodiment of the present invention.
Figure 2:
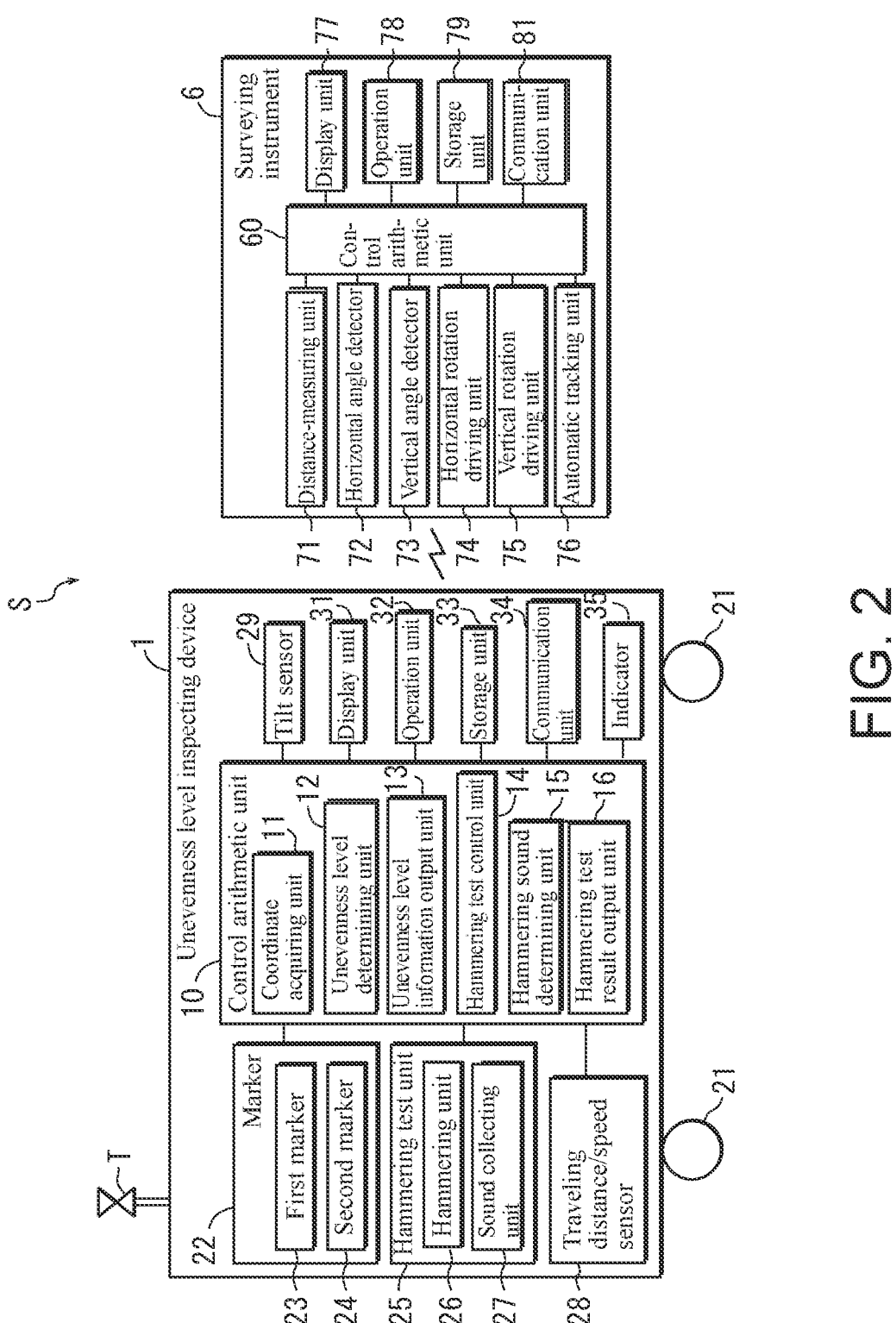
FIG. 2 is a configuration block diagram of the same inspecting system.

FIG. 1 is an external schematic view of an unevenness level inspecting system (hereinafter, simply referred to as "system") S according to an embodiment of the present invention. The system S includes an unevenness level inspecting device 1 (hereinafter, simply referred to as "inspecting device") and a surveying instrument 6. FIG. 1 illustrates a state where an unevenness level of a top end of a foundation rising 91 is inspected by using the system S, and a reference sign 92 denotes an anchor bolt. FIG. 2 is a configuration block diagram of the system S.

The system S is a system for inspecting an unevenness level of a to-be-inspected surface by causing the inspecting device 1 that includes a target T and a traveling unit 21 including wheels, etc., to travel on the to-be-inspected surface by a manual operation.

2. Inspecting Device 1

The inspecting device 1 has a housing 1a having a rectangular parallelepiped shape elongated in a traveling direction and narrow in width, and is configured to be capable of traveling on a to-be-inspected surface by rotating bodies constituting the traveling unit 21. A width of the inspecting device 1 is set according to a width of the to-be-inspected surface, and is normally set to be slightly smaller than a half width of a top end level as an inspection object in consideration of the anchor bolt 92.

On an upper surface of the housing 1a, a pole 1b as a target support member is erected, and the target T is attached to an upper end portion of the pole 1b. The target T is a so-called all-around prism configured by radially combining a plurality of triangular pyramid-shaped prisms, and retro-reflects light incident from the entire circumference (360°).

The inspecting device 1 includes the target T, a control arithmetic unit 10, the traveling unit 21, a marker 22, a hammering test unit 25, a traveling distance/speed sensor 28, a tilt sensor 29, a display unit 31, an operation unit 32, a storage unit 33, a communication unit 34, and an indicator 35.

Figure 3A:
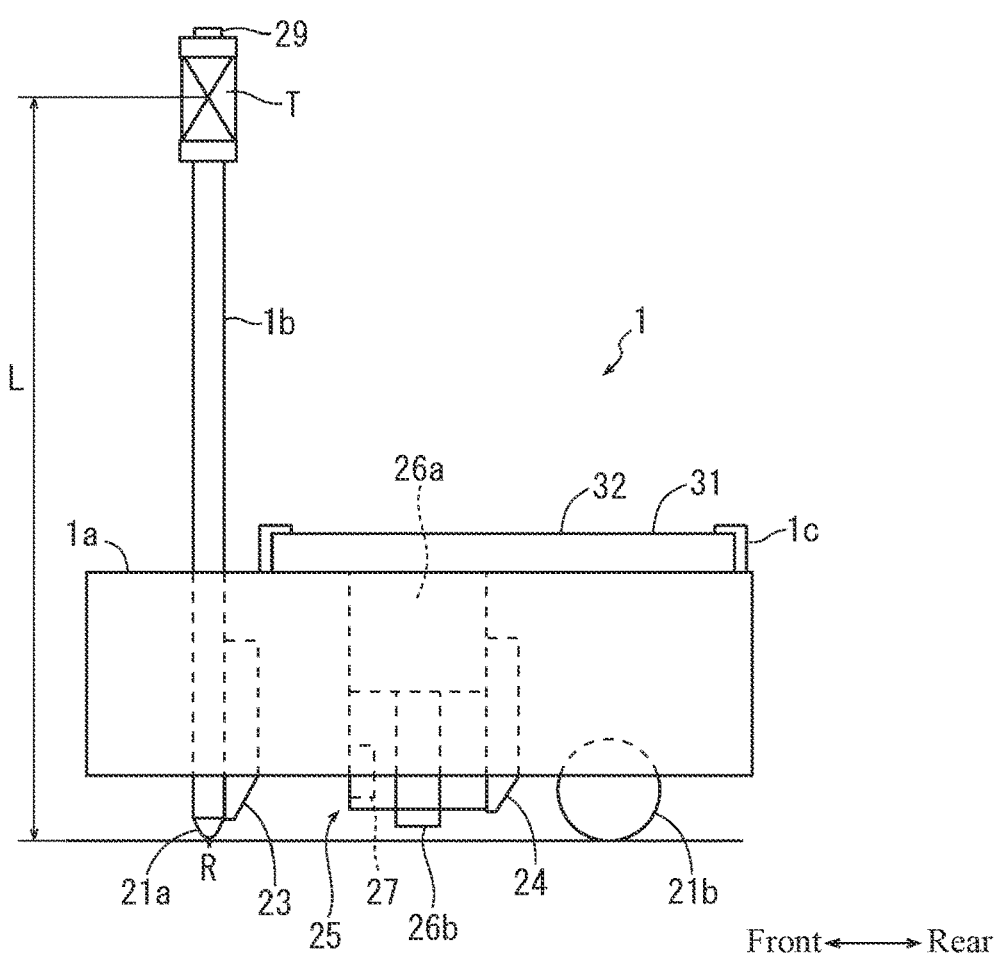
FIG. 3A is a side view of an unevenness level inspecting device constituting the same inspecting system.
Figure 3B:
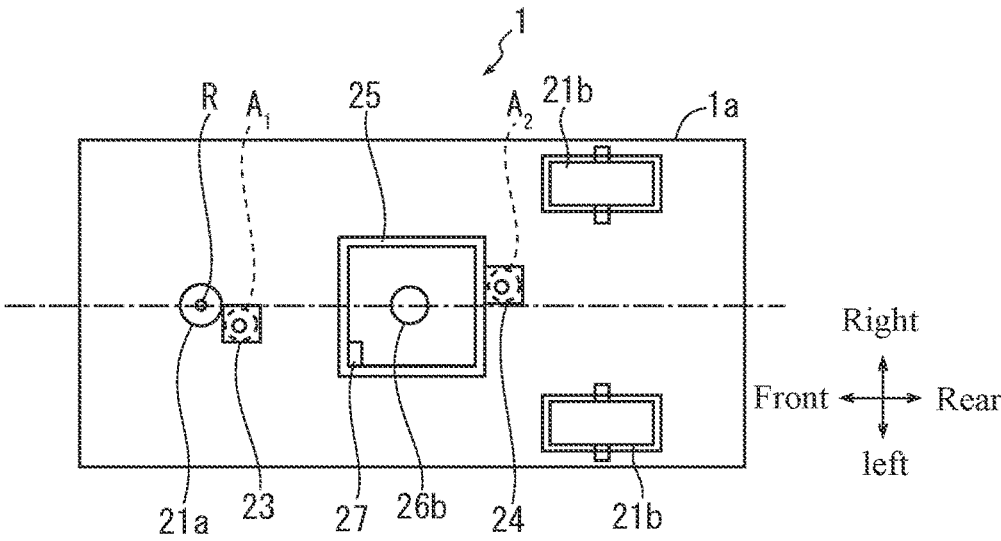
FIG. 3B is a bottom view of the same.

As illustrated in FIGS. 3A and 3B, at a lower portion of the housing 1a, the traveling unit 21 is provided. In the example illustrated in FIGS. 3A and 3B, the traveling unit 21 includes one front wheel 21a and a pair of rear wheels 21b provided left and right to face each other. The front wheel 21a is a ball caster movable in 360-degree directions by a bearing. Alternatively, the front wheel 21a may be a general universal caster. The rear wheels 21b are wheels (rollers), and are respectively independently rotatable around rotation shafts provided orthogonal to a traveling direction when traveling straight forward.

The housing 1a is adjusted so that its upper surface is level when the inspecting device 1 is placed on a level surface. The pole 1b is provided orthogonal to and on the upper surface of the housing 1a. The target T is attached just above the front wheel 21a. A worker pushes the housing 1a or the pole 1b of the inspecting device 1 by hand and manually moves the inspecting device on the to-be-inspected surface so that the front wheel 21a continued to the pole 1b is always in contact with the to-be-inspected surface at a grounding point R. In the present embodiment, a position of the grounding point R is handled as position coordinates of the inspecting device 1 (hereinafter, referred to as "inspecting device position coordinates), and a height of the grounding point R is handled as a height of the to-be-inspected surface at a measurement position of the target T.

The marker 22 includes a first marker 23 and a second marker 24. The marker 22 is a jet-type ink discharging device that includes, at least, an ink tank, an actuation mechanism, and an ink discharge mechanism, and discharges ink in the form of a dot (small circle) toward a predetermined position. The first marker 23 is disposed at a rear side of the front wheel 21a and close to the front wheel 21a, and according to control of an unevenness level information output unit 13, marks unevenness level information at a position corresponding to the target measurement position. The second marker 24 is disposed at a rear side of the hammering test unit 25 and close to the hammering test unit 25, and according to control of a hammering test result output unit 16, marks hammering test results at a position corresponding to a hammering position. The first marker 23 is configured to discharge inks in a plurality of colors, and the second marker 24 is configured to discharge ink in a color different from the ink colors of the first marker 23.

The first marker 23 and the second marker 24 are disposed so that their marking regions $A_1$ and $A_2$ deviate from each other in a left-right direction orthogonal to a front-rear direction that is a traveling direction. In FIG. 3B, positions corresponding to the marking regions $A_1$ and $A_2$ on a to-be-inspected surface are indicated with dashed lines. As a result, a marking by the first marker 23 and a marking by the second marker 24 do not overlap each other on the to-be-inspected surface even when these are at the same position in the traveling direction.

The hammering test unit 25 includes a hammering unit 26 including a solenoid coil 26a and a columnar hammer 26b, and a sound collecting unit 27. The hammering unit 26 hammers the to-be-inspected surface by moving the hammer 26b up and down repeatedly in a predetermined period according to ON/OFF of current application to the solenoid coil 26a. The sound collecting unit 27 is a so-called microphone, and collects hammering sounds issued by the hammer 26b and outputs them to the control arithmetic unit 10. The hammering test unit 25 is aligned with the pole 1b in the front-rear direction so as to prevent a size in a width direction of the inspecting device 1 from increasing. The target T and the hammering test unit 25 are aligned with each other in the front-rear direction that is the traveling direction.

Position relationships among the target T, the grounding point R of the front wheel 21a just below the target T, and a hammering position of the hammer 26b are known.

The traveling distance/speed sensor 28 includes a rotary encoder provided on, for example, the rear wheel 21b of the traveling unit 21, and detects a traveling distance of the inspecting device 1 from the number of rotations of the rear wheel 21b. In addition, the traveling distance/speed sensor 28 detects a speed from an angular velocity of rotation of the rear wheel 21b. Alternatively, the traveling distance/speed sensor 28 may be configured to detect a traveling distance and speed by measuring its own position by using a GNSS device that can detect its own position based on a navigation signal of a navigation satellite. Alternatively, the traveling distance/speed sensor 28 may be configured to detect a traveling distance and speed of the inspecting device based on position coordinates of the inspecting device obtained by a coordinate acquiring unit 11.

The tilt sensor 29 is an electronic tilt sensor, and is provided in relation to two axes of an X-axis direction (left-right direction of the device main body) and a Y-axis direction (front-rear direction of the device main body) inside the housing 1a or near the target T. The tilt sensor 29 detects a tilt of the target T at a timing synchronized with a timing of a measurement of the target T by the surveying instrument 6, and outputs a detection result to the control arithmetic unit 10.

The display unit 31 is, for example, a liquid crystal display. The operation unit 32 is, for example, a keyboard, a mouse, etc., and enables a worker to perform various inputs, selections, instructions, and determinations, etc. In the illustrated example, the display unit 31 and the operation unit 32 are integrally configured as a touch panel display, and the display is attached as a detachable display to a holder 1c at an upper portion of the housing 1a. Without limitation to this, these units may be integrally configured on an outer surface of the housing 1a.

The storage unit 33 is a nonvolatile storage as an auxiliary storage device. The storage unit 33 is, for example, an HDD (Hard Disc Drive) or SSD (Solid State Drive). The storage unit 33 may be partially configured by an external storage device such as a USB flash memory. The storage unit 33 stores at least programs for executing functions of the respective functional units of the control arithmetic unit 10 when the respective functional units are implemented software-wise.

The communication unit 34 enables wireless transmission and reception of information between the inspecting device 1 and the surveying instrument 6. As a communication means, Wi-Fi, Bluetooth (registered trademark), infrared communication, the Internet, a mobile phone network, etc., can be used.

The indicator 35 indicates that a worker is causing the inspecting device 1 to travel in an appropriate speed range based on detection results of the traveling distance/speed sensor 28. The indicator 35 includes, for example, an LED light source and a cover, and emits green light when the speed of the inspecting device 1 is within an appropriate range.

The control arithmetic unit 10 includes at least one processer, for example, a CPU (Central Processing Unit) and at least one memory. The CPU reads out various programs stored in the storage unit 23 to the memory to execute them. The control arithmetic unit 10 corresponds to a control unit of the unevenness level inspecting device described in claims. The control arithmetic unit 10 includes, as functional units, the coordinate acquiring unit 11, an unevenness level determining unit 12, the unevenness level information output unit 13, a hammering test control unit 14, a hammering sound determining unit 15, and the hammering test result output unit 16.

As a basic operation of the inspecting device 1, the coordinate acquiring unit 11 acquires three-dimensional position coordinates of the target T (hereinafter, referred to as "target position coordinates") acquired by the surveying instrument 6 at predetermined intervals, and calculates three-dimensional position coordinates of the inspecting device 1 (hereinafter, referred to as "inspecting device position coordinates"). The acquired coordinates are stored in the storage unit 33. Specifically, position coordinates of the inspecting device 1 can be obtained from acquired target position coordinates, a detection value of the tilt sensor 29, and a distance L (known) from the target T to the grounding point R. A height component (z-axis component) of the inspecting device position coordinates is calculated as a height of the inspecting device 1.

The unevenness level determining unit 12 sets a reference height as a reference of unevenness level determination, and calculates a height component (z component) of position coordinates of the inspecting device acquired by the coordinate acquiring unit 11 from the position coordinates of the inspecting device, as a height of the to-be-inspected surface at the measurement position. The reference height may be input in advance by a worker. When a predetermined reference height is set, this reference height is input and set. It is also preferable that the foundation rising height at the site is measured at a plurality of points with a measuring tape, etc., before the start of the inspection. For example, an average value, a median value, or a mode value of the measurement results is used as a representative value and this may be input and set as a reference height. When the reference height is not set in advance, a height of the inspecting device 1 at an inspection start point is set as a reference height.

The unevenness level information output unit 13 prints (marks) unevenness level information corresponding to a determined unevenness level onto a corresponding position on the to-be-inspected surface by controlling the first marker 23.

The hammering test control unit 14 conducts a hammering test by controlling the hammering unit 26 and the sound collecting unit 27.

The hammering sound determining unit 15 determines whether the to-be-inspected surface has an abnormality from a hammering sound difference, and when an abnormality is found, controls the second marker 24 and prints (marks) a mark indicating the abnormality onto a position corresponding to a hammering position on the to-be-inspected surface. Here, an abnormality means peeling or cracking of the top end leveler, or floating due to a bonding failure. When an abnormality occurs, the waveform and frequency of the hammering sound are different from those in the case where the top end leveler has no problem and is normally layered. For example, the hammering sound determining unit 15 performs machine learning by using learning data obtained by labeling normal and abnormal hammering sounds of various top ends, and determines whether the to-be-inspected surface is normal or abnormal by using a learned model for determining normal/abnormal hammering sounds.

It is also possible that, for example, at the site, normal hammering sounds are registered before the start of the inspection, and when a hammering sound deviating from the normal hammering sounds is detected, an abnormality is determined.

The hammering test result output unit 16 marks hammering test results on the to-be-inspected surface when the hammering sound determining unit 15 determines an abnormality.

The functions of these functional units may be implemented hardware-wise in circuits and programmable logic devices, or may be implemented software-wise by programs. When the functions are implemented by programs, these programs may be stored in a computer-readable storage medium such as a CD (Compact Disc), a DVD (Digital Versatile Disc), a Blu-ray (registered trademark) disc, and distributed.

3. Surveying Instrument 6

The surveying instrument 6 is a motor-driven total station having an automatic tracking function. The surveying instrument 6 includes, in appearance, a base portion 6a provided on a leveling device, a bracket portion 6b that rotates horizontally on the base portion 6a, a telescope 6c that rotates vertically at the center of the bracket portion 6b, and a display unit 77 and an operation unit 78 provided on a front surface of the bracket portion 6b.

The surveying instrument 6 includes a control arithmetic unit 60, a distance-measuring unit 71, a horizontal angle detector 72, a vertical angle detector 73, a horizontal rotation driving unit 74, a vertical rotation driving unit 75, an automatic tracking unit 76, the display unit 77, the operation unit 78, a storage unit 79, and a communication unit 81.

The distance-measuring unit 71 emits distance-measuring light such as an infrared laser toward the target T, and receives reflected light to measure a distance to the target T.

The horizontal angle detector 72 detects a rotation angle of the bracket portion 6b in the horizontal direction, and the vertical angle detector 73 detects a rotation angle of the telescope 6c in the vertical direction. Accordingly, an angle of an optical axis of the distance-measuring light, that is, an angle of the target T is measured. The horizontal rotation driving unit 74 and the vertical rotation driving unit 75 are motors that are controlled by the control arithmetic unit 60 and respectively drive a horizontal rotation shaft and a vertical rotation shaft.

The automatic tracking unit 76 outputs, as tracking light, an infrared laser, etc., of a wavelength different from that of the distance-measuring light and receives reflected light by an image sensor such as a CCD sensor or CMOS sensor, and acquires a landscape image including the tracking light and a landscape image excluding the tracking light. The control arithmetic unit 60 detects a position of the target T from a difference between these images, and performs automatic tracking so that the telescope 6c always faces the target T.

The display unit 77 and the operation unit 78 are user interfaces of the surveying instrument, and these units can execute functions such as command and setting of a surveying operation, and confirmation of an operation status and measurement results.

The storage unit 79 consists of, for example, a memory card, an HDD, etc. The storage unit 79 stores various programs for realizing various functions including a distance-measuring program of the surveying instrument 6. In addition, the storage unit 79 stores various information acquired by the control arithmetic unit 60.

The communication unit 81 enables wireless communication with the inspecting device 1 by using the same communication method. Target position coordinates calculated under the control of the control arithmetic unit 60 are transmitted to a controller 4 at predetermined intervals.

The control arithmetic unit 60 is a microcontroller configured by mounting a CPU, a ROM, a RAM, etc., on an integrated circuit, and controls the rotation driving units 74 and 75, and controls the distance-measuring unit 71 and the automatic tracking unit 76. The control arithmetic unit 60 calculates target position coordinates from distance and angle measurement results of the target T. The control arithmetic unit 60 automatically tracks the target T, and according to an instruction from the inspecting device 1, makes distance and angle measurements of the target T and transmits target position coordinates to the inspecting device 1 at all times (at predetermined very short intervals).

The surveying instrument 6 is not limited to a total station, and various surveying devices capable of acquiring three-dimensional position coordinates of a target, such as a scanner device having an automatic tracking function and a target scanning function, can be applied.

4. Inspecting Method

Figure 4:
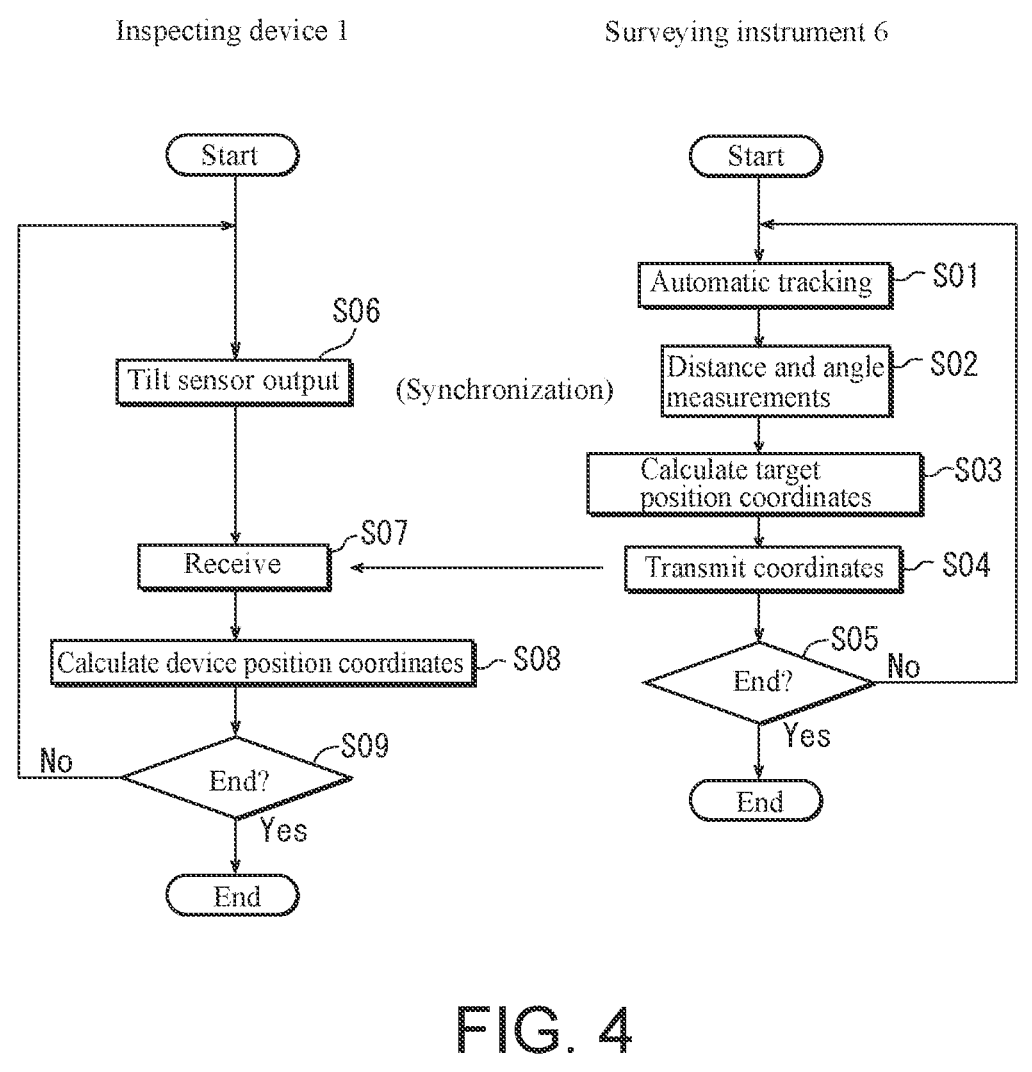

Next, an inspecting method using the system S will be described. First, basic operations of the system S will be described. As basic operations, the system S executes processes illustrated in FIG. 4 during an inspection.

The surveying instrument 6 makes distance and angle measurements of the target T in Step S02 while performing automatic tracking in Step S01. Next, in Step S03, the surveying instrument 6 calculates target position coordinates, and in Step S04, transmits the target position coordinates to the inspecting device 1. In Step S05, until a worker instructs the completion through the inspecting device 1, Steps S01 to S05 are repeated at all times.

On the other hand, when the inspecting device 1 starts an inspection according to a worker's instruction, in Step S06, the tilt sensor 29 outputs a detection value to the control arithmetic unit at a timing synchronized with the distance and angle measurements of the target T made by the surveying instrument 6. In Step S07, the inspecting device 1 receives target position coordinates from the surveying instrument 6, and in Step S08, the inspecting device 1 calculates inspecting device position coordinates. In Step S09, until the worker instructs the completion, Steps S06 to S09 are repeated at all times.

Figure 5:
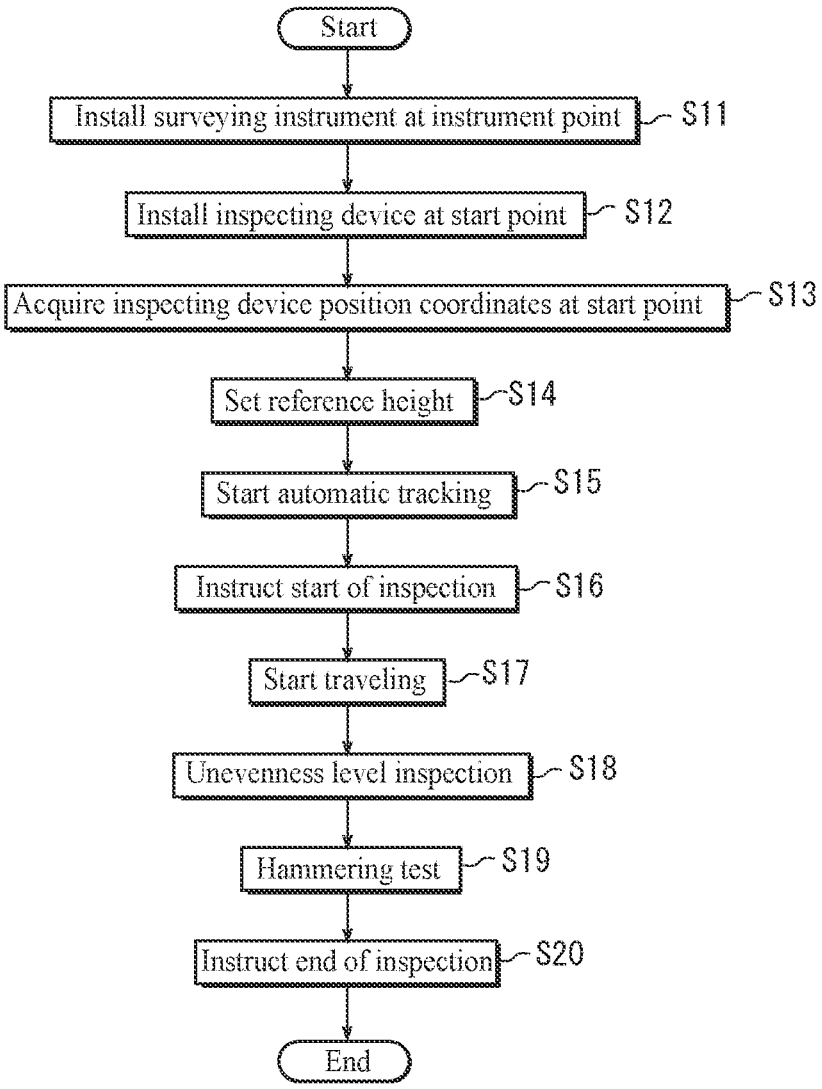
FIG. 5 is a flowchart describing the entirety of an unevenness level inspecting method using the same inspecting system.

FIG. 5 is a flowchart describing the work procedures of this entire inspecting method. When starting an inspection, first, in Step S11, a worker installs the surveying instrument 6 at an instrument point. The instrument point is a known point, or is known by measuring known points after installation of the surveying instrument 6. A direction angle of the surveying instrument 6 is known by measuring a plurality of known points. Next, in Step S12, the worker installs the inspecting device 1 at a start point.

Next, in Step S13, according to a worker's instruction, the surveying instrument 6 measures target position coordinates of the inspecting device 1 installed at the start point, and accordingly, as in the basic operations, acquires inspecting device position coordinates. Next, in Step S14, as described later, the inspecting device 1 sets a reference height.

Next, in Step S15, according to a worker's instruction, the surveying instrument 6 is caused to start automatic tracking. Next, in Step S16, when the inspecting device 1 instructs the surveying instrument 6 to start an inspection according to a worker's instruction, the inspecting device 1 and the surveying instrument 6 start basic operations illustrated in FIG. 4.

Then, in Step S17, the worker starts traveling of the inspecting device 1 by pushing the inspecting device 1 by hand.

In Step S18, the inspecting device 1 inspects an unevenness level of a to-be-inspected surface, and at the same time, in Step S19, conducts a hammering test of the to-be-inspected surface. In Step S20, when the completion of the inspection is instructed by the worker, the inspection is completed.

In an inspection route, when a linear portion is completed and a change in direction is needed, the worker lifts the inspecting device 1 and changes its direction, and places the inspecting device 1 again on the inspection route. While the inspecting device 1 is not grounded, the processing is interrupted, and when the inspecting device 1 is grounded again, the processing restarts from Step S17. An interruption of the processing may be determined when, for example, values of the traveling distance/speed sensor stop fluctuating. Alternatively, it is also possible that a floating detection sensor is separately provided on a bottom surface of the housing 1a, and an interruption of the processing is determined when the inspecting device 1 is lifted and separates from the to-be-inspected surface.

Figure 6:
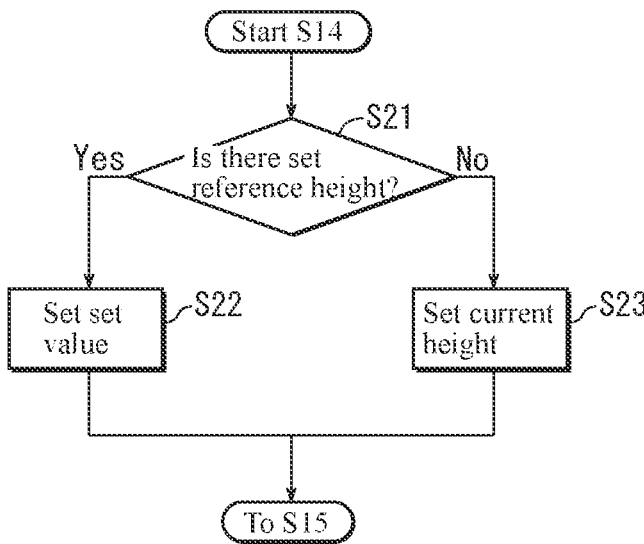
FIG. 6 is a process flowchart related to settings of a reference height for an unevenness level inspection in the same inspecting method.
Figure 7:
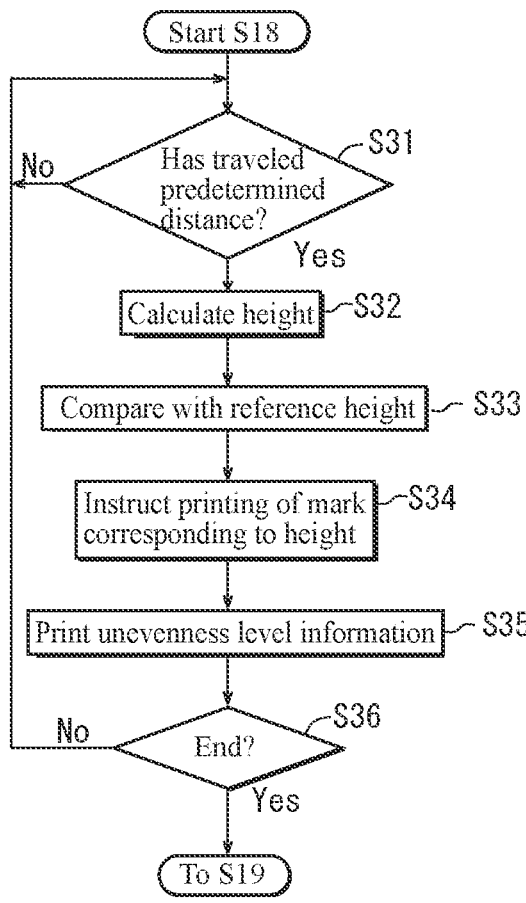
FIG. 7 is a process flowchart related to an unevenness level inspection in the same inspecting method.
Figure 9:
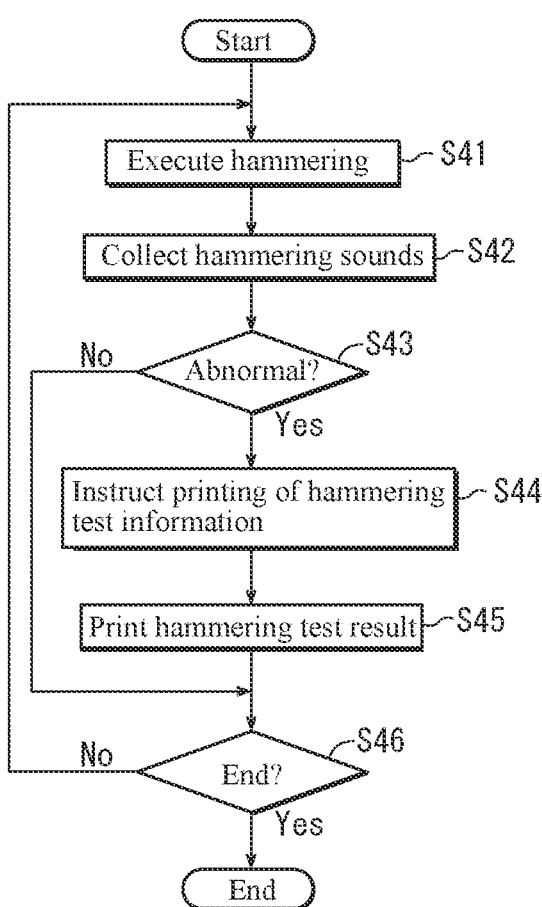
FIG. 9 is a process flowchart related to a hammering test in the same inspecting method.

FIGS. 6, 7, and 9 are respectively flowcharts of detailed processes of the inspecting device 1 in Steps S14, S18, and S19.

As illustrated in FIG. 6, when Step S14 starts, in Step S21, the unevenness level determining unit 12 determines whether there is a reference height set in advance. In the case of Yes, the unevenness level determining unit 12 sets the set value as a reference height. In the case of No, a height of the to-be-inspected surface at the start point is calculated from position coordinates of the inspecting device acquired in Step S13, and this height is set as a reference height, and the processing shifts to Step S15.

As illustrated in FIG. 7, in Step S18, when an unevenness level inspection is started, in Step S31, the unevenness level determining unit 12 determines whether the inspecting device 1 has traveled a predetermined distance (for example, 3 cm) based on output values of the traveling distance/speed sensor 28. When the inspecting device 1 has traveled the predetermined distance (Yes), in Step S32, the unevenness level determining unit 12 calculates a height of the to-be-inspected surface based on target three-dimensional coordinates at the current position.

Next, in Step S33, the unevenness level determining unit 12 determines an unevenness level by comparing the calculated to-be-inspected surface height and the reference height. Next, in Step S34, the unevenness level information output unit 13 commands the first marker 23 to perform printing (marking) corresponding to a magnitude of a difference between the current height and the reference height. Accordingly, in Step S35, the first marker 23 prints marking indicating unevenness level information onto the to-be-inspected surface. In Step S36, until a command to complete the inspection is given, Steps S31 to S36 are repeated.

FIG. 8B illustrates an example of markings $M_1$ printed on a to-be-inspected surface in a case where an inspection was conducted by causing the inspecting device to travel along an inspection route 93 on the top end of the foundation rising 91 illustrated in FIG. 8A. Markings $M_1$ indicate unevenness level inspection results. At a center of the foundation rising 91, a plurality of anchor bolts 92 project vertically.

As illustrated in FIG. 8B, in this example, the markings $M_1$ indicating unevenness level information are indicated by a color that differs depending on a magnitude of a difference from the reference height in a manner such that no marking is marked when the difference from the reference height is ±1 mm, a pink marking is marked when the difference is +1 to +3 mm, a red marking is marked when the difference is +3 to +5 mm, a light-blue marking is marked when the difference is −1 to −3 mm, and a blue marking is marked when the difference is −3 to −5 mm Alternatively, when the difference is ±1 mm, a white marking may be marked. Here, ±1 mm is a range of required top end level accuracy. Here, for convenience, a positive value indicates a difference when the height is higher than the reference height, and a negative value indicates a difference when the height is lower than the reference height. The marking colors may be assigned according to a predetermined rule, and preferably, bi-polar color progression is used so that the same height as the reference height is defined as 0 and a white marking or no marking is marked. In this case, the color becomes darker according to a magnitude of the difference. When a height of the start point is set as the reference height, and the level of the reference height is unknown in the entirety, it is preferable to use a single hue color progression. In this case, the color becomes darker as a difference from the reference height increases (changes from a negative value toward a positive value). In this way, an unevenness level can be intuitively recognized.

According to the present embodiment, unevenness level information is indicated according to a magnitude of a difference between a current height and a reference height, so that even a general client having ownership of a construction object, etc., not an expert in this field can visually recognize an unevenness level of the upper surface.

When a difference from a reference height is within a range satisfying predetermined standards, no marking is marked, and a range not satisfying the standards is indicated by a color that differs depending on a magnitude of the difference, so that a range not satisfying the standards can be easily recognized.

Further, a case where a difference to the reference height is positive and a case where the difference is negative are indicated by colors of different types. Therefore, determination as to which works of additional application or scraping is needed at the position, can be easily made.

As illustrated in FIG. 9, in Step S19, when a hammering test starts, in Step S41, the hammering test control unit 14 starts hammering with the hammer 26b by controlling the hammering unit 26, and starts hammering sound collection by controlling the sound collecting unit 27 in Step S42. The collected hammering sounds are associated with hammering position coordinates and successively output to the hammering sound determining unit 15.

In Step S43, the hammering sound determining unit 15 determines whether there is an abnormality. When an abnormality is found (Yes), the processing shifts to Step S44, and the hammering sound determining unit 15 commands the second marker 24 to print a marking at a corresponding position. In Step S44, the second marker 24 discharges ink and prints hammering test results. In Step S45, until a command to complete the test is given, Steps S41 to S46 are repeated.

FIG. 8C illustrates an example of a to-be-inspected surface on which markings $M_2$ of hammering test results are printed in addition to the markings $M_1$ indicating unevenness level information Hammering test results are indicated by yellow, etc., that are marks different from the types of the colors of the unevenness level information. Alternatively, a marking in a fluorescent color may be marked. In this way, according to the present embodiment, in addition to the unevenness level, hammering test results of the upper surface state can be easily visually recognized at the site.

The top end leveler may crack or peel off by shrinking when dried due to its properties. Even when the top end leveler cracks or peels off, no problem occurs as long as the level surface is maintained. However, there are certain cases that cracking causes unevenness. A worker as an expert grasps these circumstances. However, common people including an owner of a construction object, etc., may have an unfavorable impression at the time of on-site inspection due to the extremely deteriorated finish by cracks, and this may cause a problem between the owner. In the present embodiment, while the presence of peeling, etc., is indicated by a marking, and the fact that there is no problem with the unevenness level is also indicated at the same time. Therefore, the owner, etc., concerned about peeling can be relieved.

In the present embodiment, marking regions of the first marker 23 and the second marker 24 are disposed adjacent to a height measurement position and a hammering position, however, they do not match each other, so that the marking position slightly deviates from the inspection position. However, when additional application or scraping is performed in actuality after the inspection, a worker at the site further inspects the periphery of the position where an abnormality has been detected in detail, so that no problem occurs in practical use.

However, by adjusting a timing of marking according to a traveling speed detected by the traveling distance/speed sensor 28, the position accuracy of the marking with respect to the height measurement position and the hammering test position can be improved.

5. Modifications

The inspecting device 1 according to the embodiment may be modified as follows.

Modification 1

Figure 10A:
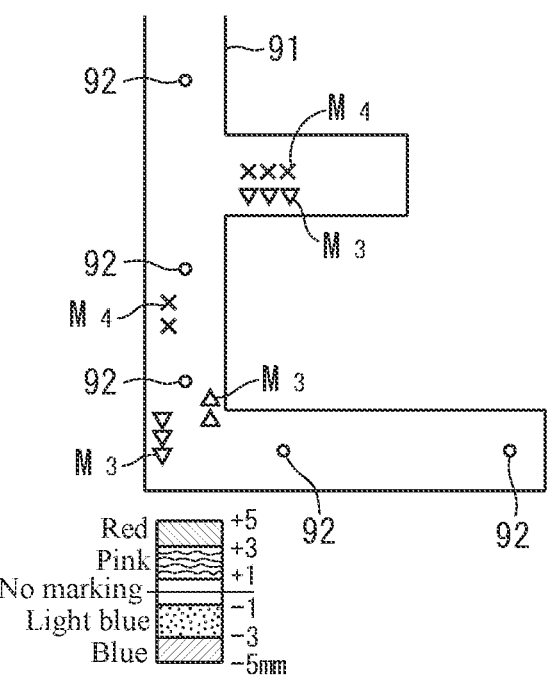
FIGS. 10A and 10B are views illustrating different examples of inspection results to be marked by using modifications of the same system.

For example, the first marker 23 is configured as a stamp that can print a predetermined figure in a plurality of colors, and the second marker 24 is configured as a stamp that can print a figure different from the figure of the first marker. For example, as illustrated in FIG. 10A, unevenness level information and hammering test results may be respectively indicated by markings $M_3$ and $M_4$ by a stamp that prints a triangular mark and a stamp that prints a cross mark.

Modification 2

Figure 10B:
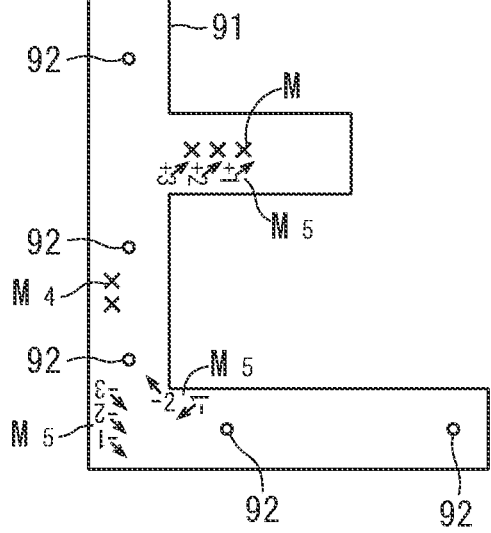

It is also possible that the first marker 23 is configured as an ink-jet printer, and marks a marking $M_5$ that numerically indicates a difference between a height of a to-be-inspected surface and a reference height together with a mark (arrow) indicating unevenness level information as illustrated in FIG. 10B.

Second Embodiment

1. Inspecting System SA

Figure 11:
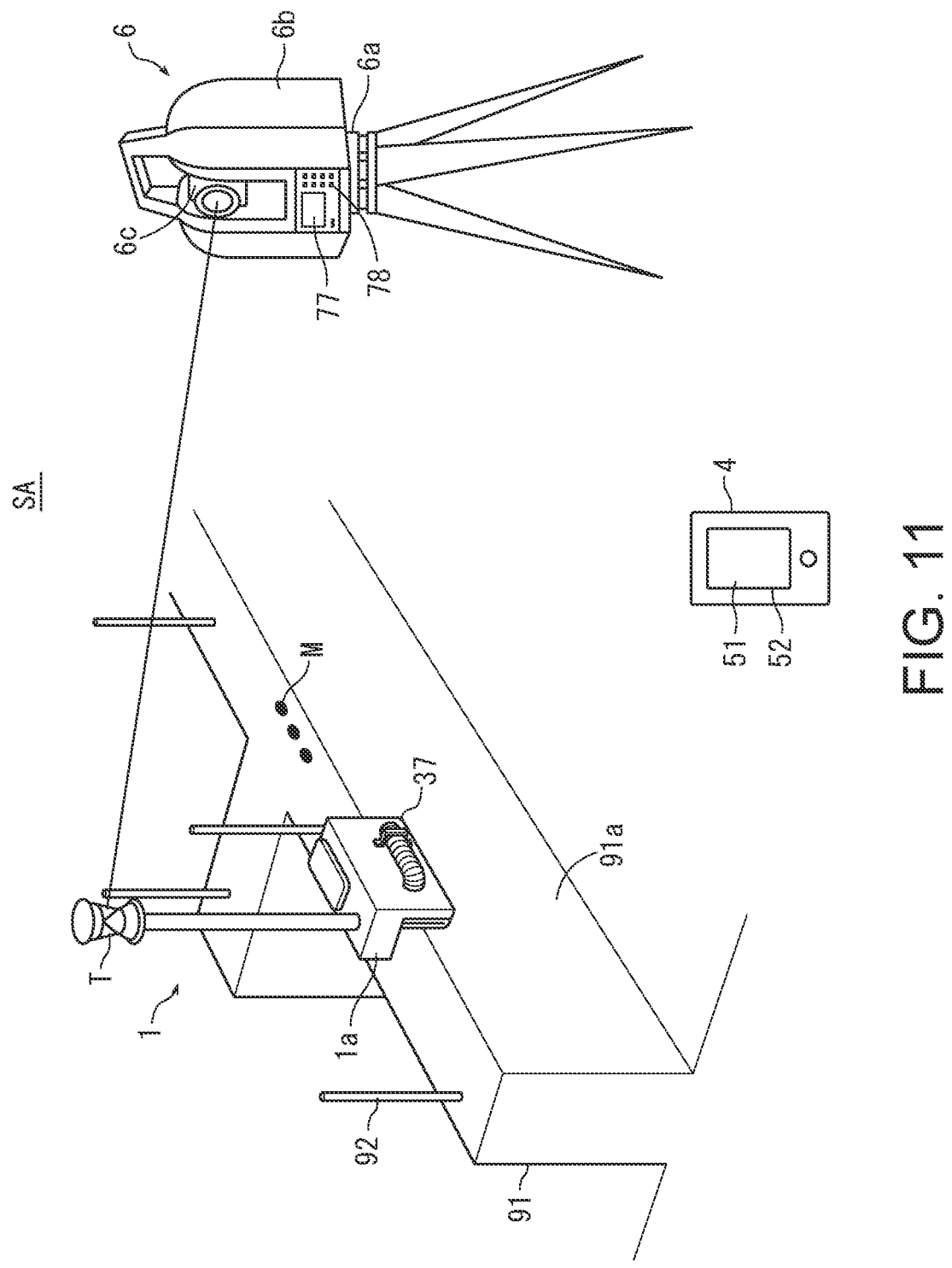
FIG. 11 is a view illustrating an outline of an unevenness level inspecting system according to a second embodiment of the present invention.
Figure 12:
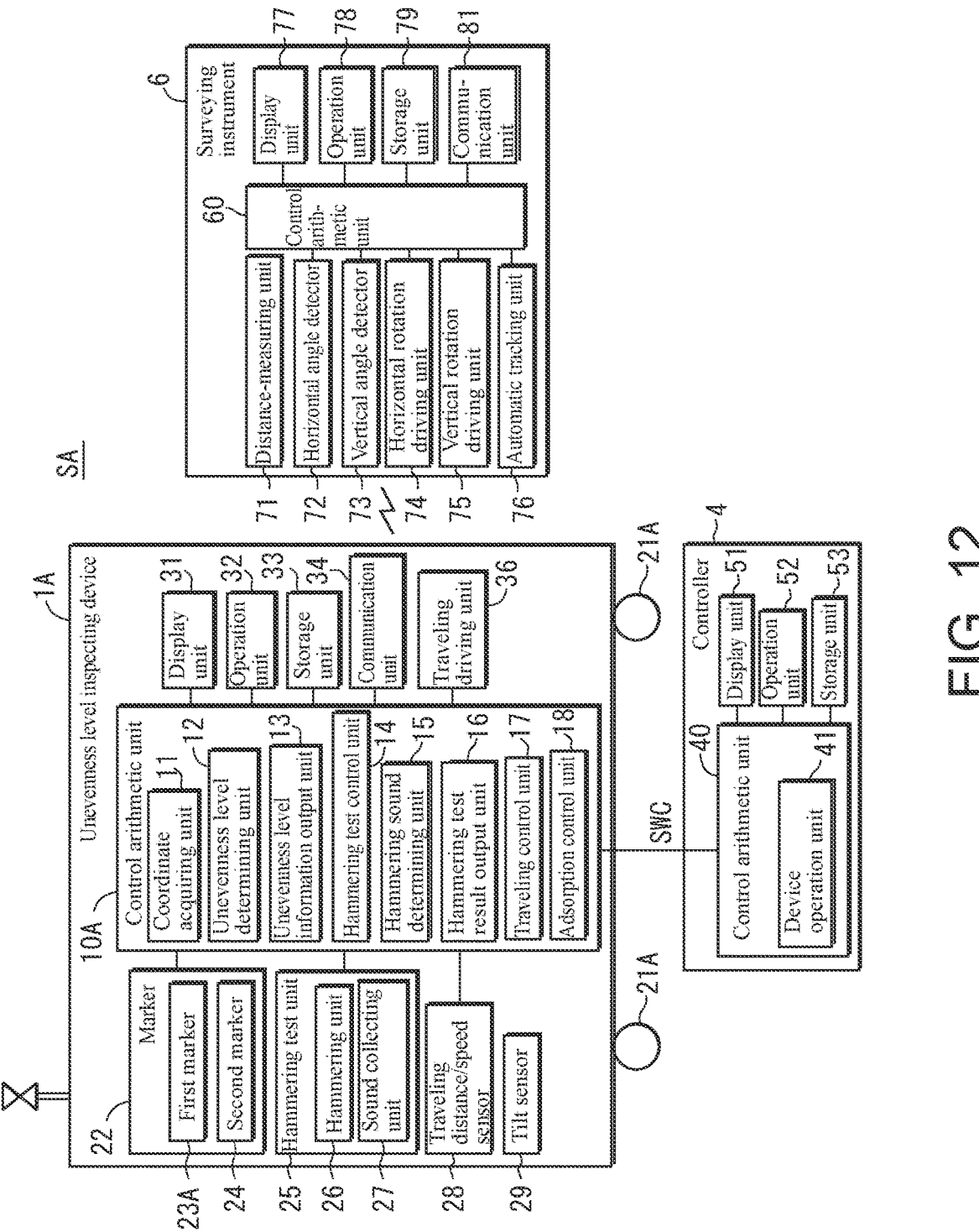
FIG. 12 is a configuration block diagram of the same inspecting system.
Figure 13A:
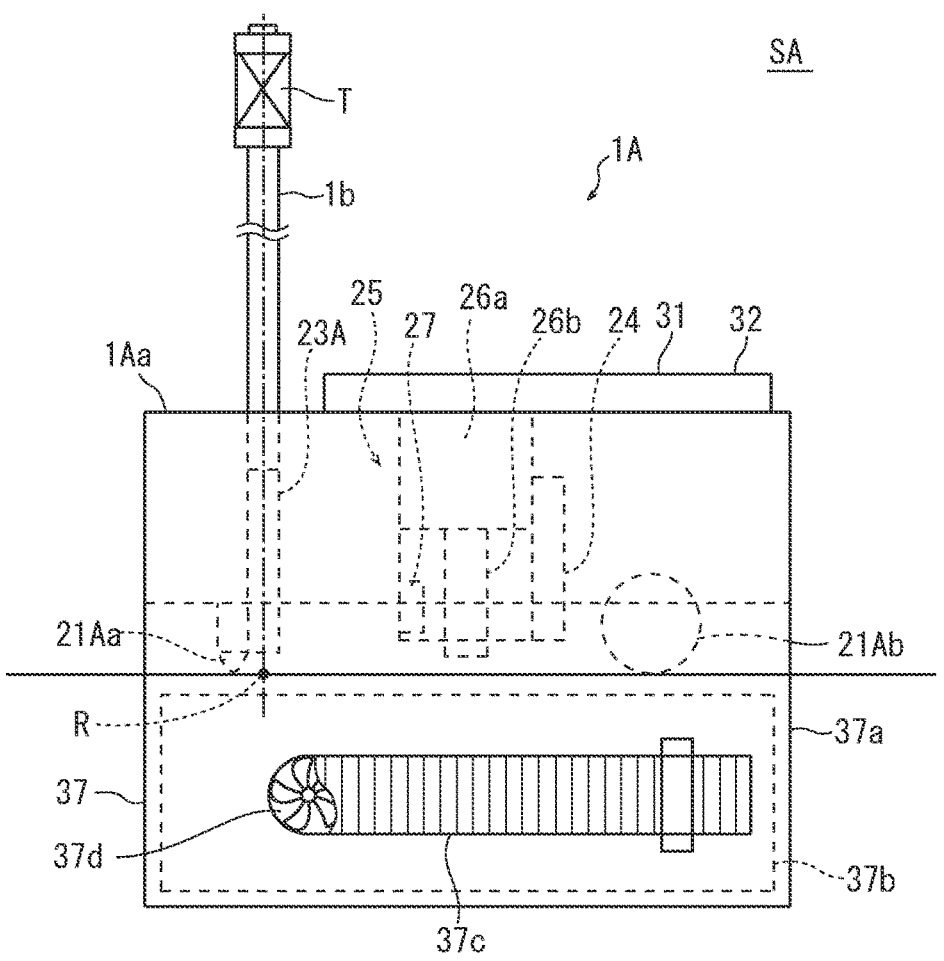
FIG. 13A is a side view of an unevenness level inspecting device constituting the same inspecting system.
Figure 13B:
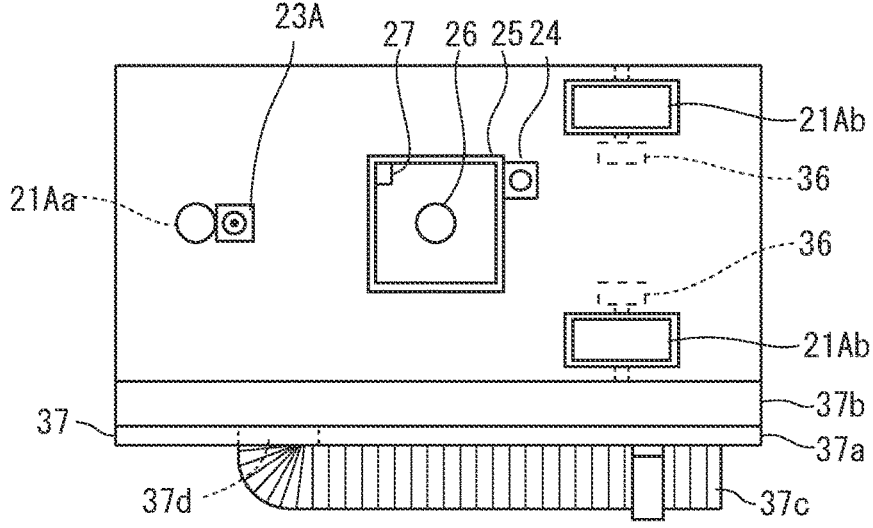
FIG. 13B is a bottom view of the same.

FIG. 11 is an external schematic view of an unevenness level inspecting system SA according to a second embodiment, FIG. 12 is a configuration block diagram, FIG. 13A is a side view, and FIG. 13B is a bottom view.

2. Inspecting Device 1A

A housing 1Aa of an inspecting device 1A includes an adsorbing portion 37 extending downward from one side surface, and has an inverted-L shape in section although the housing 1a of the inspecting device 1 has a rectangular parallelepiped shape rectangular in section. In addition, although the inspecting device 1 can be caused to travel by a manual operation, the inspecting device 1A includes traveling driving units 36 and can automatically travel. The inspecting device 1A is operated by a controller 4 connected by SWC (Short-range Wireless Communication) such as infrared communication, Bluetooth (registered trademark), or Wi-Fi.

A traveling unit 21A of the inspecting device 1A includes one front wheel 21Aa and a pair of left and right rear wheels 21Ab. The front wheel 21Aa is a ball caster. To the rear wheels 21Ab, traveling driving units 36 that are motors are respectively connected, and by controlling rotations of the rear wheels 21Ab, the inspecting device 1A can travel forward and backward. When the traveling unit 21A is not driven by the traveling driving units 36, the inspecting device 1A can travel forward and backward by a manual operation.

Although the front wheel 21a of the inspecting device 1 is just below the target T, in the inspecting device 1A, a center of a first marker 23A is aligned with the position just below the target T. The first marker 23A is aligned with and close to the pole 1b in the front-rear direction. Accordingly, the first marker 23A can perform marking at a measurement position of the target T.

The adsorbing portion 37 includes an adsorbing main body 37a, a skirt 37b, and a duct hose 37c. The adsorbing main body 37a is a rectangular plate having a suction fan 37d at a center. The skirt 37b is provided to enclose the outer periphery of the adsorbing main body 37a, and extends to the inner side of the inspecting device 1A. The skirt 37b is made of an elastic member such as rubber having a predetermined frictional coefficient, and is configured to come into close contact with a side wall of a structure (foundation rising 91) projecting upward when the inspecting device 1A is installed along an outer edge portion of the structure as illustrated in FIG. 11. The duct hose 37*c* is attached to an outer surface of the adsorbing main body 37*a* so as to cover the suction fan 37*d* and have an exhaust port directed rearward.

A control arithmetic unit 10A further includes, as functional units, a traveling control unit 17 and an adsorption control unit 18. The traveling control unit 17 drives the traveling driving units 36 according to a remote operation instruction from the controller, and controls the inspecting device 1A so that the inspecting device 1A travels forward and backward at a constant speed.

The adsorption control unit 18 controls driving of the suction fan 37*d*, and exhausts air in a space defined by the adsorbing main body 37*a*, the skirt 37*b*, and the side wall 91*a* of the structure to the outside through the duct hose 37*c* to maintain the space at a predetermined negative pressure. In this way, while adsorbing onto the side wall of the structure, the inspecting device 1A can travel along the outer edge of the top end without coming off.

3. Controller 4

The controller 4 is a computer, for example, a personal computer, a tablet terminal, a PDA, etc. The controller 4 includes at least a control arithmetic unit 40, a display unit 51, an operation unit 52, and a storage unit 53. In the illustrated example, the controller is a tablet terminal. The inspecting device 1A and the controller 4 are connected by SWC (Short-range Wireless Communication) described above, and can input and output information to each other.

The display unit 51 is, for example, a liquid crystal display. The operation unit 52 is, for example, a keyboard, a mouse, etc., and enables various inputs, selections, determinations, and instructions. In the illustrated example, the display unit 51 and the operation unit 52 are integrally configured as a touch panel display.

The storage unit 53 is a so-called auxiliary storage device, and is, for example, an HDD or SSD. The storage unit 53 may be partially configured by an external storage device such as a USB flash memory. The storage unit 53 stores at least programs for operating the inspecting device 1A.

The control arithmetic unit 40 is a control arithmetic unit that includes at least a CPU and a memory, and causes the CPU to read out a program stored in the storage unit 53 to the memory and execute it. The control arithmetic unit 40 includes a device operation unit 41 as a functional unit. The device operation unit 41 controls traveling start, forward traveling, backward traveling, and stoppage of the inspecting device 1A according to a worker's instruction input through the operation unit 52.

The inspecting device 1A may be configured so that the display unit 31 and the operation unit 32 are omitted, and the functions of the display unit 31 and the operation unit 32 are executed by the display unit 51 and the operation unit 52 of the controller 4, and the controller 4 is attached to the holder 1*c* of the inspecting device 1A and used.

4. Inspecting Method

Procedures and processing of an inspecting method using the system SA are generally the same as those of the system S, however, in a linear portion of an inspection route, automatic traveling is performed and an inspection is executed according to an instruction from the controller.

According to the configuration described above, an unevenness level inspection and a hammering test of a to-be-inspected surface can be conducted by causing the inspecting device to automatically travel by using the traveling driving units 36, so that the work efficiency can be improved.

In particular, the adsorbing portion 37 is provided along the side surface, and traveling can be performed while adsorbing onto a side wall extending downward from the to-be-inspected surface. This is advantageous for inspecting an unevenness level of a top end of a structure that is narrow in width and rising like a top end of a foundation rising.

The unevenness level inspecting devices according to the first and second embodiments described above are configured to simultaneously conduct two inspections of an unevenness level inspection and a hammering test. However, without limitation to this, it is also possible to configure a device having two modes of an unevenness level inspection mode and a hammering test mode and conducts only one of these.

Preferred embodiments of the present invention have been described above, however, the embodiments described above are just examples of the present invention, and these can be combined based on the knowledge of a person skilled in the art, and such a combined embodiment is also included in the scope of the present invention.

REFERENCE SIGNS LIST

1: Unevenness level inspecting device
22: Marker
23: First marker
24: Second marker
25: Hammering test unit
26: Hammering unit
26*b*: Hammer
27: Sound collecting unit
1A: Inspecting device
1Aa: Housing
10A: Control arithmetic unit
21A: Traveling unit
23A: First marker
L: Distance
T: Target

The invention claimed is:

1. An unevenness level inspecting device comprising:
a target at a known distance from a to-be-inspected surface;
a traveling unit for traveling on the to-be-inspected surface;
a first marker for marking information on the to-be-inspected surface; and
a control unit including at least a processor and a memory, the control unit configured to control the first marker, wherein
the control unit calculates a height of the to-be-inspected surface at a measurement position of the target based on three-dimensional position coordinates of the target input each time the unevenness level inspecting device travels a predetermined distance, and controls the first marker so as to mark unevenness level information indicating a difference between the height of the to-be-inspected surface and a reference height on a corresponding position on the to-be-inspected surface, and
the unevenness level information is marked in a color that differs depending on a magnitude of the difference between the height of the to-be-inspected surface and the reference height.

2. The unevenness level inspecting device according to claim 1, wherein the reference height is a representative value of heights of the to-be-inspected surface obtained by measuring a plurality of points on the to-be-inspected surface.

3. The unevenness level inspecting device according to claim 1, further comprising:

a hammering test unit including a hammering unit configured to hammer the to-be-inspected surface with a hammer, and a sound collecting unit configured to detect a hammering sound produced by the hammer; and a second marker configured to mark information on the to-be-inspected surface, wherein the control unit determines whether an upper surface of the to-be-inspected surface has an abnormality based on a hammering sound collected by the hammering test unit, and when detecting an abnormality, controls the second marker to perform marking at a position corresponding to a hammering position.

4. The unevenness level inspecting device according to claim 2, further comprising:

a hammering test unit including a hammering unit configured to hammer the to-be-inspected surface with a hammer, and a sound collecting unit configured to detect a hammering sound produced by the hammer; and a second marker configured to mark information on the to-be-inspected surface, wherein the control unit determines whether an upper surface of the to-be-inspected surface has an abnormality based on a hammering sound collected by the hammering test unit, and when detecting an abnormality, controls the second marker to perform marking at a position corresponding to a hammering position.

5. The unevenness level inspecting device according to claim 3, wherein a marking region of the first marker and a marking region of the second marker deviate from each other in a left-right direction orthogonal to a traveling direction.

6. The unevenness level inspecting device according to claim 4, wherein a marking region of the first marker and a marking region of the second marker deviate from each other in a left-right direction orthogonal to a traveling direction.

7. The unevenness level inspecting device according to claim 3, further comprising:

a rectangular parallelepiped housing for housing the first marker, the second marker, and the hammering test unit; and a traveling driving unit configured to drive the traveling unit, wherein an adsorbing portion extending downward is provided on one side surface of the housing, and the adsorbing portion includes an adsorbing main body including a suction fan, a skirt enclosing the outer periphery of the adsorbing main body, and a duct hose for exhausting air suctioned by the suction fan rearward, and the inspecting device is configured to travel on an edge portion of a structure by driving of the traveling driving unit.

8. The unevenness level inspecting device according to claim 4, further comprising:

a rectangular parallelepiped housing for housing the first marker, the second marker, and the hammering test unit; and a traveling driving unit configured to drive the traveling unit, wherein an adsorbing portion extending downward is provided on one side surface of the housing, and the adsorbing portion includes an adsorbing main body including a suction fan, a skirt enclosing the outer periphery of the adsorbing main body, and a duct hose for exhausting air suctioned by the suction fan rearward, and the inspecting device is configured to travel on an edge portion of a structure by driving of the traveling driving unit.

9. The unevenness level inspecting device according to claim 5, further comprising:

a rectangular parallelepiped housing for housing the first marker, the second marker, and the hammering test unit; and a traveling driving unit configured to drive the traveling unit, wherein an adsorbing portion extending downward is provided on one side surface of the housing, and the adsorbing portion includes an adsorbing main body including a suction fan, a skirt enclosing the outer periphery of the adsorbing main body, and a duct hose for exhausting air suctioned by the suction fan rearward, and the inspecting device is configured to travel on an edge portion of a structure by driving of the traveling driving unit.

10. The unevenness level inspecting device according to claim 5, further comprising:

a rectangular parallelepiped housing for housing the first marker, the second marker, and the hammering test unit; and a traveling driving unit configured to drive the traveling unit, wherein an adsorbing portion extending downward is provided on one side surface of the housing, and the adsorbing portion includes an adsorbing main body including a suction fan, a skirt enclosing the outer periphery of the adsorbing main body, and a duct hose for exhausting air suctioned by the suction fan rearward, and the inspecting device is configured to travel on an edge portion of a structure by driving of the traveling driving unit.

11. An unevenness level inspecting system comprising:

the unevenness level inspecting device according to claim 1; and a surveying instrument emitting distance-measuring light such toward the target, and receiving reflected light to measure a distance and an angle to the target.

12. An unevenness level inspecting system comprising:

the unevenness level inspecting device according to claim 2; and a surveying instrument emitting distance-measuring light such toward the target, and receiving reflected light to measure a distance and an angle to the target.

13. An unevenness level inspecting system comprising:

the unevenness level inspecting device according to claim 3; and a surveying instrument emitting distance-measuring light such toward the target, and receiving reflected light to measure a distance and an angle to the target.

14. An unevenness level inspecting system comprising:

the unevenness level inspecting device according to claim 5; and a surveying instrument emitting distance-measuring light such toward the target, and receiving reflected light to measure a distance and an angle to the target.

15. An unevenness level inspecting system comprising:

the unevenness level inspecting device according to claim 7; and a surveying instrument emitting distance-measuring light such toward the target, and receiving reflected light to measure a distance and an angle to the target.

16. An unevenness level inspecting method using an unevenness level inspecting device including a target at a known distance from a to-be-inspected surface, a traveling unit for traveling on the to-be-inspected surface, a first marker for marking information on the to-be-inspected 5 surface, and a control unit including at least a processor and a memory, the control unit configured to control the first marker, wherein the control unit calculates a height of the to-be-inspected surface at a measurement position of the target based on 10 three-dimensional position coordinates of the target input each time the unevenness level inspecting device travels a predetermined distance, and controls the first marker so as to mark unevenness level information indicating a difference between the height 15 of the to-be-inspected surface and a reference height on a corresponding position on the to-be-inspected surface, and the unevenness level information is marked in a color that differs depending on a magnitude of the difference 20 between the height of the to-be-inspected surface and the reference height.

\* \* \* \* \*